United States Patent [19]

Courtney-Pratt

[11] 4,238,148
[45] Dec. 9, 1980

[54] THREE-DIMENSIONAL PHOTOGRAPHIC TECHNIQUE

[75] Inventor: Jeofry S. Courtney-Pratt, Locust, N.J.

[73] Assignee: Bell Telephone Laboratories, Incorporated, Murray Hill, N.J.

[21] Appl. No.: 111,874

[22] Filed: Jan. 14, 1980

[51] Int. Cl.³ .................... G03B 35/02; G03B 35/16; G03B 39/06

[52] U.S. Cl. .................................. 354/112; 352/84; 353/7

[58] Field of Search .............................. 354/112–116, 354/354; 350/130; 353/7; 358/88, 89; 352/84, 86, 43, 46, 81

[56] References Cited

U.S. PATENT DOCUMENTS

| | | | |
|---|---|---|---|
| 3,291,555 | 12/1966 | Browning | 352/84 X |
| 3,294,002 | 12/1966 | Vitkine | 352/84 X |
| 3,682,553 | 8/1972 | Kapany | 352/86 X |

FOREIGN PATENT DOCUMENTS 712997   8/1954   United Kingdom ...................... 352/84

OTHER PUBLICATIONS

Caulfield, H. J. et al., "Three Dimensional Images," in Applied Optics, vol. 16, pp. 774–775.
Courtney-Pratt, J. S., "Some Unconventional Methods of High-Speed Photo," Bell Systems Tech. Pub. Monograph, 4076, pp. 24–25.

*Primary Examiner*—John Gonzales
*Attorney, Agent, or Firm*—David I. Caplan

[57] ABSTRACT

A three-dimensional photographic system includes a source of pulsed-optical radiation characterized by an output optical pulse of risetime length less than the depth resolution desired of an object to be photographed. The pulse is directed on the object; the reflected radiation from the object is collected by an array of optical lenslets (lenticular plate), which forms a corresponding array of images of the object. This array of images is streaked, for example, by a streaking image converter tube, to form a corresponding array of streaked images in accordance with the said array of images of the object as a function of time. The array of streaked images is then recorded by a photographic film camera on other recording means; the recorded film can then be analyzed or viewed with human eyes for the purpose of three-dimensional analysis or viewing of the object. Particularly one optical pulse enables a recording which can subsequently be unscrambled to yield a three-dimensional image for measurement or for binocular viewing even though the distance of the object for the viewing point is much too great for normal binocular stereoscopic perception of depth.

13 Claims, 4 Drawing Figures

THREE-DIMENSIONAL PHOTOGRAPHIC TECHNIQUE

FIELD OF THE INVENTION

This invention relates to the field of optical imaging techniques, and more particularly to stereoscopic (three-dimensional) photography.

BACKGROUND OF THE INVENTION

In a paper by H. J. Caulfield and S. Somerstein entitled "Three-dimensional Images," published in *Applied Optics*, Vol. 16, pp. 774–775 (Mar. 1977), a three-dimensional camera image system is described in which an object to be photographed is illuminated by means of a pulsed laser. The laser provides a pulse of light of extremely short duration, so that the length of the pulse,—or more specifically, the risetime of the pulse multiplied by the speed of light,—is less than the desired depth (third dimension) resolution. The cross section of the pulse is shaped by a lens system to the form of a thin rectangle ("line"), in order to illuminate the object along a corresponding line. The reflected pulse of radiation from the thus illuminated line of the object is recorded on a photographic plate (or emulsion film) in a "streak" camera—that is, one in which during the exposure time, there is relative movement between the recording emulsion and the resulting line image of the thus illuminated line of the object at constant velocity v in a direction that is substantially perpendicular both to the line of sight and to the line image. In this manner, depth information concerning the thus illuminated line of the object is recorded on the photographic emulsion.

For example, if the object is in the form of an optically diffusely reflecting circular cylinder whose axis is parallel to and situated in front of an optically diffusely reflecting plane (FIG. 1), then the resulting "streak" photograph on a photographic film 100 of a single line of the object is in the form of a straight line portion, of thickness x, broken by a curved line situated at a distance d from the straight line portion (FIG. 2). This distance d is proportional to the distance at the object from the cylinder to the plane, the constant of proportionality being twice the ratio of the streaking speed of the camera to the speed of light. The thickness x of the straight line portion, to this same scale, is increased over that which would be recorded by the camera in the absence of streaking by an amount proportional to the non-zero optical pulse length. The depth resolution of this streak camera is determined by the sharpness of the leading edge of the recorded streaked line portion, which in turn, to this same scale, is proportional to the risetime length, $l'$, i.e., risetime t of the optical pulse multiplied by the speed of light c, where $l'=ct'$. The effect of this non-zero risetime is indicated by $x'$ in FIG. 2.

One disadvantage of the foregoing system is the resulting need for making and examining as many separate photographic plates (or films) as there are lines of the object desired to be recorded. Thus, such a system would be very difficult to implement in the case of even a slowly moving object, because of the requirement of carefully controlled scanning of the object with a sequence of pulses of light, each pulse incident on a separate line of the object in order to obtain a complete picture of the object. Moreover, the requirement of examining all of the separate photographs renders readout of the three-dimensional information for a complete picture very tedious.

It would, therefore, be desirable to have a technique for three-dimensional photography which avoids the foregoing difficulties.

SUMMARY OF THE INVENTION

A single, extremely short light pulse is arranged to illuminate an entire object to be photographed (such as a cylinder 13 tangent to a plane 14, as illustrated in FIG. 3). By "extremely short" is meant that the duration t of the light pulse—or, more specifically, the risetime length ($l'=ct'$)—is much less than the depth of the object to be photographed—that is, the risetime length $l'$ is advantageously made equal to or less than twice the desired depth resolution.

Optical radiation reflected by the object is focused on a photographic emulsion film as a streaked, dissected image array. By "dissected image array" is meant an array, typically rectangular, of dots each of whose photographic grain intensities in the film is proportioned to the reflected light intensity from the localized region of the object corresponding to the dot; by "streaked" is meant that the dots are all spread out in the form of short, mutually parallel lines ("streaks"), as produced, for example, by moving the dissected image in a camera containing the photographic film at a constant velocity v transverse to the line of sight during the exposure of the film to the reflected light. After standard chemical processing of the film to develop the picture of the streaked dissected image array, readout ("unscrambling") of the resulting picture can be accomplished, for example, by illuminating the developed composite picture in the photographic emulsion through a lenticular plate, as shown in FIG. 4, so arranged that at any one moment of time only one array of points (or dots) making up one of the dissected images is illuminated. The lenticular plate, developed composite plate, and illuminating system, are located in front of an observer Y. By moving the developed composite plate parallel to the direction of the streaks in the emulsion at a velocity u (advantageously very much less than velocity v) while simultaneously moving the rest of the whole assembly (lenticular plate and optionally the illuminating system) at a suitable velocity w away from the observer, the visual impression received by the observer will be that of a three-dimensional image of the object. In this manner, a single optical pulse enables a recording of a streaked dissected image on a photographic film which can subsequently be unscrambled to yield a three-dimensional image for binocular viewing even in those cases where the distance of the object from the viewing point of the observer is too great for normal binocular stereoscopic perception of depth.

BRIEF DESCRIPTION OF THE DRAWING

This invention together with its features, objects, and advantages may be better understood from the following detailed description when read in conjunction with the drawings in which.

Only for the sake of clarity, none of the drawings is to any scale.

DETAILED DESCRIPTION

Figure 3:
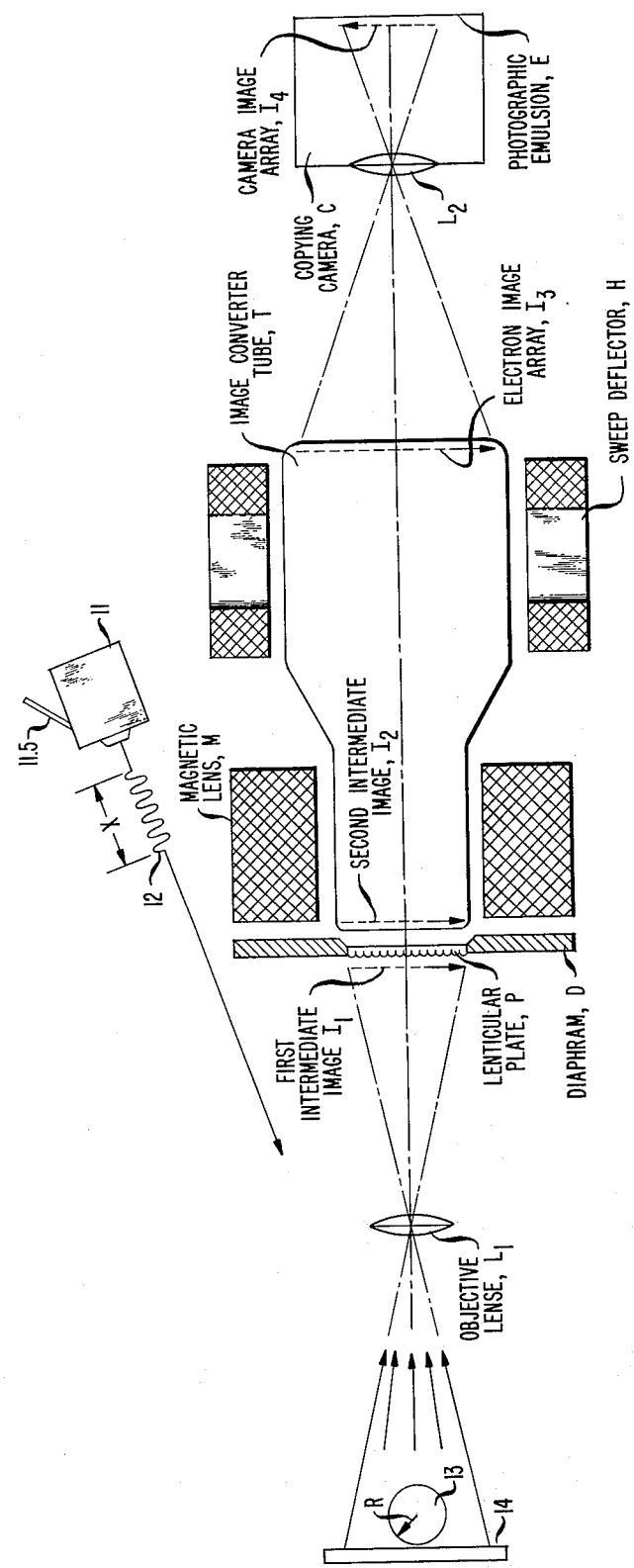
FIG. 3 is an optical diagram of a three-dimensional photographic camera system useful in conjunction with a specific embodiment of the invention.

As shown in FIG. 3, a three-dimensional photographic camera system 10 includes a pulsed laser beam source 11, which produces an optical pulse 12 of duration $t = l/c$. For the sake of definiteness in an example only, the object to be photographed in three-dimensions is in the form of a circular cylinder 13, of radius R, tangent to a plane 14. The beam 12 is aimed such that the object is fully illuminated by the pulse 12, by means of standard optical beam directing means 11.5. It is, thus, important that the risetime length $l'$ of the pulse 12 correspond to less than twice the minimum depth feature size of the object to be resolved by the system 10; for example, this risetime length, $l' = ct'$, should be less than about 1/20 the radius R of the cylinder 13. Thus, if the radius R is equal to about a meter, the risetime $t'$ of the pulse should be less than about 1/3 nanosecond for a depth resolution $l'$ of about 5 cm.

An objective lens $L_1$ focuses the reflected light from the objects 13 and 14 to a real image $I_1$ in front of a lenticular plate P. Typically, the two-dimensional array of spherical lenslets in this plate P is formed by a pair of arrays of cylindrical lenslets with crossed axes. Each of these arrays of cylindrical lenslets is typically formed in a separate lucite plate, 2.5 mm thick, about 5 cm×5 cm. The pitch spacing between next neighboring cylindrical lenslets is typically about 0.4 mm, thus, providing a resulting array of 125×125 spherical lenslets. The radius of curvature of each cylindrical lenslet is typically about 2.5 mm; the focal length f of each lenslet is thus typically about 5 mm, which is sufficiently large to produce an intermediate dissected image array $I_2$ on the photosensitive cathode surface of an image converter tube T. A diaphragm D physically supports the lenticular plate P for this purpose. More specifically, the array of lenslets focus the image $I_1$ into a corresponding dissected array $I_2$ on the photocathode of the image converter tube T, each point image in the array being relatively bright or dark depending upon the local intensity of the intermediate image $I_1$ in the local neighborhood of the nearest lenslet.

Figure 1:
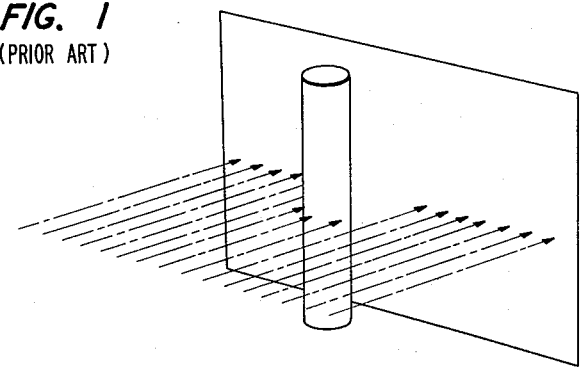
FIG. 1 is an optical diagram of a three-dimensional photography illumination technique of the prior art.
Figure 2:
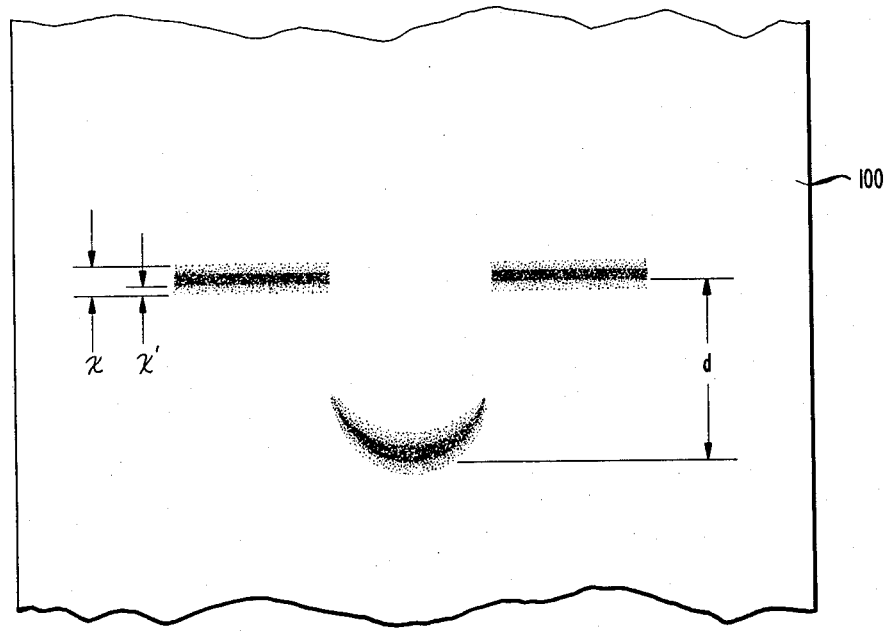
FIG. 2 is a diagram of a sample two-dimensional photograph (one lateral dimension plus one depth dimension) obtainable with the system illustrated in FIG. 1.
Figure 4:
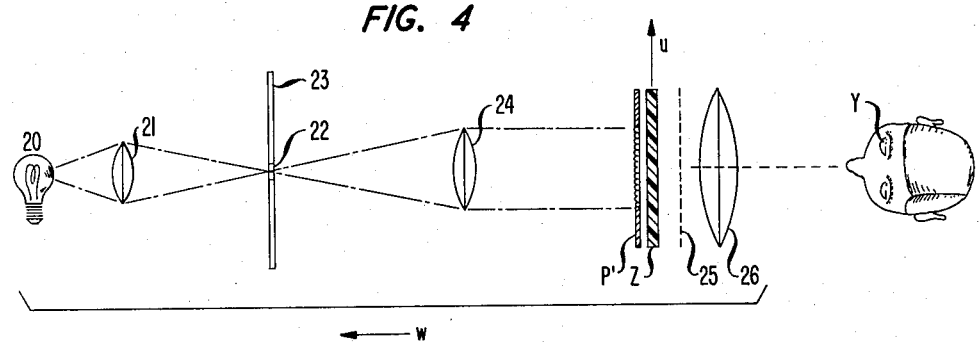
FIG. 4 is an optical diagram of an optical projection system useful for three-dimensional readout of the photographs obtained with the system shown in FIG. 3, in accordance with a specific embodiment of the invention.

The image tube T is in the form of an evacuated chamber having a photosensitive surface illuminated in a square array of image elements having the same pitch spacing as that of the lenticular plate P. These photocathode elements emit a multiplicity of electron beams having a current density pattern in accordance with the dissected image array $I_2$. A (magnetic) lens arrangement M focuses the electron beams emitted by the array of photocathodes to an image array $I_3$ on a fluorescent screen on the opposed surface of the tube T. This image array $I_3$ is streaked (i.e. moved transversely) at an advantageously constant velocity v, by means of sweep deflector coils H, in accordance with an advantageously linear time sweep function resulting in a substantially constant sweep velocity v in the range of about $10^4$ to $10^6$ meter/sec, typically about $1.2 \times 10^5$ meter/sec (time resolution in this example is typically about ⅓ nanosecond, corresponding to a depth resolution of about 5 cm). The sweep direction is oriented at a small angle, typically about 3 to 6 degrees of arc, with respect to one of the major axes of the dissected image array $I_2$. A copying camera C is arranged with a camera lens $L_2$ to focus the thus streaked, dissected image array $I_3$ as a streaked, dissected camera image array $I_4$ on a light-sensitive photographic emulsion film E in the camera. This image array $I_4$ will be in the form of an array of streaks in response to a single exposure corresponding to a single pulse from the pulsed laser 11. The thus streaked, dissected image array $I_4$ can be developed by standard chemical processes to form a developed photographic emulsion film Z (FIG. 4) in accordance with this streaked, dissected image. For proper optical alignment and imaging, the planes of the image tube, lenses $L_1$, $L_2$, plate P, and emulsion film E are all substantially parallel. In a typical case, for example, the magnification of image $I_3$ relating to $I_1$ and of $I_4$ to $I_3$ can even the unity.

For the purpose of illustration by way of an example only, the focal length of the objective lens $L_1$ is typically about 100 cm with an aperture diameter of about 0.8 cm. The laser radiation is typically of wavelength as supplied by a Q-switched ruby laser source 11 having a pulse output of a few joules or few tens of joules. The magnification of the image $I_3$ relative to $I_1$ and of $I_4$ relative to $I_3$ can both be unity.

Light for viewing (FIG. 4) by an observer Y is conveniently supplied by a light source, such as an automobile headlight bulb with the filament imaged by a lens 21 on an aperture 22, typically of 1 mm diameter, in an opaque screen 23. A collimating lens 24, such as a telescope doublet with approximately a 7 cm aperture and a 50 cm focal length, collimates the light as a parallel beam directed onto an unscrambling lenticular plate P', which focuses the light on the developed emulsion Z. In the illustrative case of unity magnifications both in the image tube T and in the copying camera G, this plate P' has a size of 5 cm×5 cm with a pitch spacing of 0.4 mm—i.e., an array of 125×125 lenslets, the same array as in the plate P of FIG. 3; otherwise, the pitch and size of the plate P' is scaled proportionately to the product of these magnifications. The image elements on the developed emulsion Z at the focus of the lenticular plate typically will then have a diameter of about 1/10 of the pitch spacing of the lenslets, i.e., 1/25 mm. Behind the developed emulsion Z is located an optically diffusing screen 25 and a field lens 26, both of which are optional, for the purpose of improved viewing—to wit, smoother looking image and greater optical intensity, respectively, for the observer. The distance between the diffusing screen 25 and the emulsion Z is advantageously at least approximately equal to the focal lengths f' of the lenslets in the plate P'; the distance between the diffusing screen 25 and the field lens 26 is likewise advantageously at least approximately equal to f'; and the distance from the emulsion Z to the observer Y can be as little as about 0.7 meter, and even less if either the diffusing screen 25 or the field lens 26 (or both) is in place, or if a shorter focal length f' is used. The plane of the lenticular plate P' is advantageously substantially parallel to the plane of the film Z. Of course, the positive directions of u and w as vectors should be selected so that both correspond to scanning simultaneously in the same depth direction of the original object as evinced in the streaked, dissected image in the developed emulsion film Z.

In order to achieve the perception of depth for the observer Y, the emulsion Z is moved at velocity u in a direction parallel to the streaked (line) images on the emulsion Z and perpendicular to the line of sight (from observer to emulsion). Simultaneously, the assembly of the lenticular plate P' and this emulsion Z (plus the lens 26 and the screen 25, if used) are moved together at velocity w along the line of sight direction (plus, optionally, the lens 24, the opaque apertured screen 23, the lens 21, and the light source 20).

The magnitudes of the velocities u, w, and v (sweep in the image tube T), advantageously at least approximately satisfy: $u/w = 2v/Mc$ . . . (Eq. 1), where M is the linear (lateral) magnification of the image at the emulsion Z with respect to the original object, typically about 1/80. In order to satisfy Eq. 1 conveniently, u is selected, in an illustrative example, to be about 8 cm/sec and w about 125 cm/sec in conjunction with $M = 1/80$ and $v = 1.2 \times 10^7$ cm/sec. On the other hand, w can be selected in the range of about 40 to 400 cm/sec, in conjunction with compensating adjustments in u and/or v and/or M. Conveniently, in any case, u is of the range of about 2 to 20 cm/sec.

During viewing, conveniently the velocity w along the line of sight is reversed every 1/20 sec or less to avoid flicker, while simultaneously the velocity u is similarly reversed (repetition rate of 10 per second or more). In this way, the scene being viewed by the observer Y is renewed and reinforced at a sufficiently fast repetition rate to avoid flicker, the integrating time of the eyes and brain of a human observer being more than the repetition time (1/10 sec).

Although this invention has been described in terms of a specific embodiment, various modifications can be made without departing from the scope of the invention. For example, instead of the image converter tube T, a rotating mirror can be used for sweeping the image formed by the lenticular plate, typically with a time resolution of as short as $10^{-9}$ sec (corresponding to a depth resolution of about 15 cm). Instead of moving the photographic emulsion Z with the velocity u, the lenticular plate P' can be moved; or, both this emulsion and the plate can be moved perpendicular to the line of sight so long as their relative velocity in this direction is u.

I claim:

1. A method for viewing a streaked, dissected image on a developed photographic film including the steps of:
    (a) directing light through a lenticular plate onto the film;
    (b) moving the film relative to the plate at a velocity u in a direction parallel to the plane of the film, the plane of the plate being substantially parallel to the plane of said film;
    (c) simultaneously moving the lenticular plate and the film at a velocity w perpendicular to said plane of the film.

2. A method for viewing a streaked, dissected image on a developed photographic film including the steps of:
    (a) directing light through a lenticular plate onto the film;
    (b) moving the plate relative to the film at a velocity u in a direction parallel to the plane of the film, the plane of the film being substantially parallel to the plane of said plate;
    (c) simultaneously moving the lenticular plate and the film at a velocity w perpendicular to said plane of the film.

3. The method of claim 1 or 2 in which said film contains a streaked dissected image array.

4. The method of claim 3 in which said velocity u is substantially parallel to the streaks of said dissected image array, and in which said light is in the form of a parallel beam of light.

5. The method of claim 4 in which u is of the order of 8 cm/sec.

6. The method of claim 5 in which an assembly of the plate and film is moved at a velocity w in a direction perpendicular to said plane, the magnitude of w being measured with respect to an observer.

7. The method of claim 6 in which w is in the range of about 40 to 400 cm/sec.

8. The method of claim 7 in which said velocities u and w are reversed at a repetition rate of about 10 per second.

9. A method for stereoscopic photography including the steps of:
    (a) directing a pulse of optical radiation on an object, said pulse having a risetime length less than twice a desired depth resolution of the object;
    (b) forming a streaked, dissected image array of the light reflected by the object, in response to said pulse, on a photographic emulsion;
    (c) processing said emulsion, to form a developed photographic image therein corresponding to said streaked, dissected array;
    (d) unscrambling the developed image in said emulsion by simultaneously moving an unscrambling lenticular plate relative to the photographic image at a velocity u along the streaked direction and moving an assembly of said plate and emulsion at a velocity w along a line of sight perpendicular to the plane of the plate.

10. The method of claim 9 in which u is of the order of 8 cm/sec.

11. The method of claim 9 or 10 in which w is in the range of about 40 to 400 cm/sec.

12. The method of claim 11 in which the velocities u and w are simultaneously reversed at a predetermined repetition rate.

13. The method of claim 12 in which said repetition rate is about 10 per second or more.

* * * * *